United States Patent [19]

Saiia

[11] Patent Number: 4,663,924

[45] Date of Patent: * May 12, 1987

[54] APPARATUS AND METHOD FOR ESTABLISHING REEL-TO-BEDKNIFE CLEARANCE

[75] Inventor: Anthony J. Saiia, South Milwaukee, Wis.

[73] Assignee: Textron Inc., Providence, R.I.

[ * ] Notice: The portion of the term of this patent subsequent to Aug. 19, 2003 has been disclaimed.

[21] Appl. No.: 780,941

[22] Filed: Sep. 27, 1985

[51] Int. Cl.⁴ ............................................ A01O 55/20
[52] U.S. Cl. ...................................... 56/249; 56/10.2
[58] Field of Search ................................ 56/249–254, 56/10.2, DIG. 15, 11.9; 83/349

[56] References Cited

U.S. PATENT DOCUMENTS

| | | | |
|---|---|---|---|
| 2,341,913 | 2/1944 | Fields | 56/249 |
| 2,789,712 | 4/1957 | Christansen | 414/711 |
| 3,106,813 | 10/1963 | Strasel | 56/249 |
| 3,685,265 | 8/1972 | Horowitz et al. | 56/249 |
| 3,918,239 | 11/1975 | Aldred et al. | 56/249 |
| 4,335,569 | 6/1982 | Keeney et al. | 56/249 |
| 4,345,419 | 8/1982 | Chandler | 56/249 |
| 4,479,346 | 10/1984 | Chandler | 56/250 |
| 4,516,388 | 5/1985 | Chandler | 56/249 |
| 4,606,178 | 8/1986 | Saiia | 56/249 |

Primary Examiner—Gene Mancene
Assistant Examiner—John G. Weiss
Attorney, Agent, or Firm—Arthur J. Hansmann

[57] ABSTRACT

Apparatus and method for establishing reel-to-bedknife clearance in a lawn mower which has an assembly of the two elements, one movable toward and away from the other. A threaded arrangement is provided for setting the desired clearance in the apparatus, and then, upon releasing a force which moves the two cutting elements into contact with each other, a spring will re-establish the movable parts, through a lost-motion connection, to establish the desired cutting clearance.

12 Claims, 6 Drawing Figures

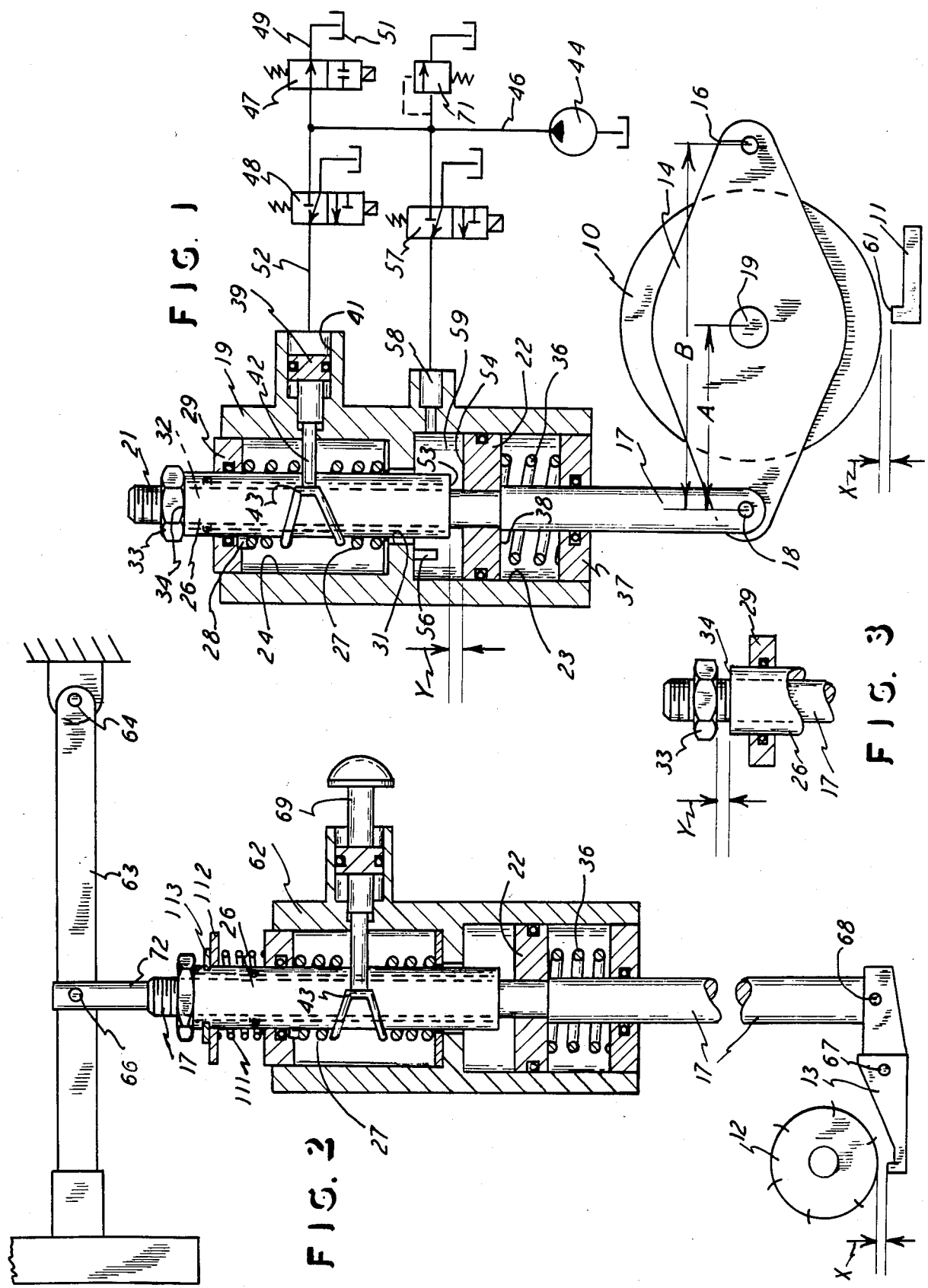

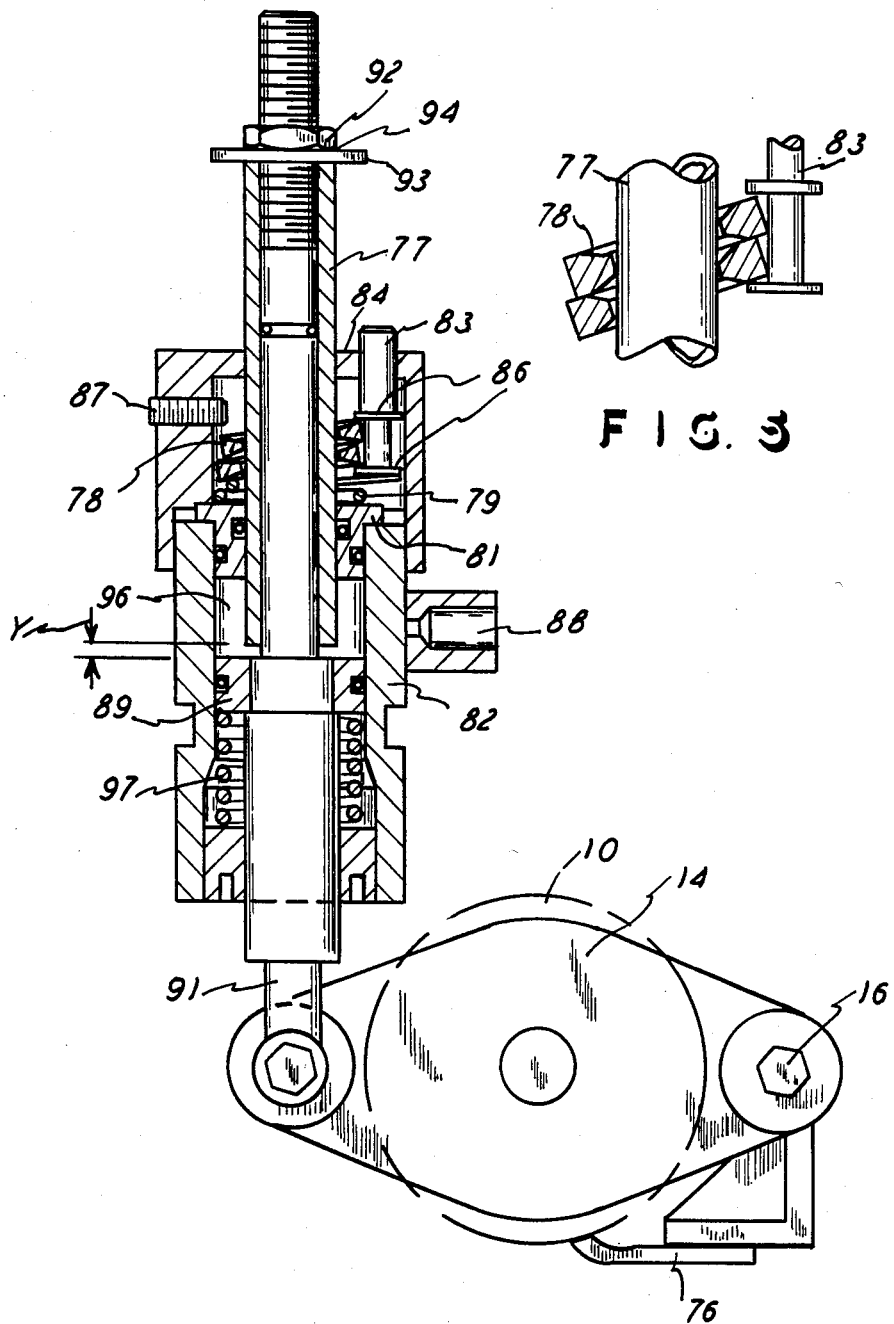

APPARATUS AND METHOD FOR ESTABLISHING REEL-TO-BEDKNIFE CLEARANCE

This invention relates to apparatus and method for establishing reel-to-bedknife clearance in a lawn mower.

BACKGROUND OF THE INVENTION

The prior art is already aware of various apparatus for adjusting the clearance between the reel and a bedknife in a lawn mower. In some instances, the bedknife is the movable member, and in other instances, the reel is the movable member. For instance, in U.S. Pat. No. 3,187,492, the bedknife is movable through a threaded adjustment for establishing the position of the knife relative to the reel. Also, U.S. Pat. No. 3,106,813 shows adjustment of the bedknife to the reel. U.S. Pat. Nos. 3,685,265 and 4,345,419 show movement of the reel relative to the bedknife. Further, U.S. Pat. No. 4,516,388 shows the application of hydraulics for moving the bedknife relative to the reel to establish the clearance therebetween. Also, U.S. Pat. No. 2,789,712 shows hydraulic apparatus for positioning a tractor shovel.

The present invention differs from the prior art in that it provides for an adjustment of one of the two elements in the reel and bedknife arrangement, whereby the adjustment is accurate and readily accomplished and can be made according to a desired or selected clearance. In the specific embodiments herein, the adjustment is accomplished through a lost-motion type of arrangement where the desired clearance can be established in the method and apparatus, and it can then be related to the adjustable positioning of one of the two elements relative to the other of the two elements, to establish the desired clearance between those two cutting elements.

In achieving the adjustments, one can select the desired clearance, in the field, and the two cutting elements are then brought into contact. Upon releasing of an actuating means which brought the elements into contact, the previously established and desired clearance becomes present between the two elements. In the present embodiments, reliance is not made totally on hydraulics, and thus hydraulic leakage is not at all a factor in the method and apparatus employed herein.

The present invention provides for an on-the-job adjustment or setting, in accordance with the desires of the operator. Also, the entire system is capable of releasing the reel for sharpening the bedknife, and when debris, such as sticks and stones, become lodged between the bedknife and the reel, thereby avoiding dulling or damage to the cutting elements. Further, the present invention provides for minute dimensional adjustments, such as 0.001 to 0.003 inches, to provide for the optimum adjustment and avoid excessive wear between the respective cutting edges and yet assure that the grass will be well mowed.

Still further, this invention provides a way to set the clearance in a manner independent of utilizing displacement of a certain quantity of hydraulic fluid.

BRIEF DESCRIPTION OF THE DRAWINGS

FIG. 1 is a diagramatic view of one embodiment of this invention.

FIG. 2 is a diagramatic view of another embodiment of this invention.

FIG. 3 is a view of an upper fragment of FIGS. 1 and 2.

FIGS. 4 and 6 are sectional views of other embodiments of this invention.

FIG. 5 is an enlargement of a portion of FIG. 4.

DETAILED DESCRIPTION OF THE PREFERRED APPARATUS AND METHOD

Figure 8:
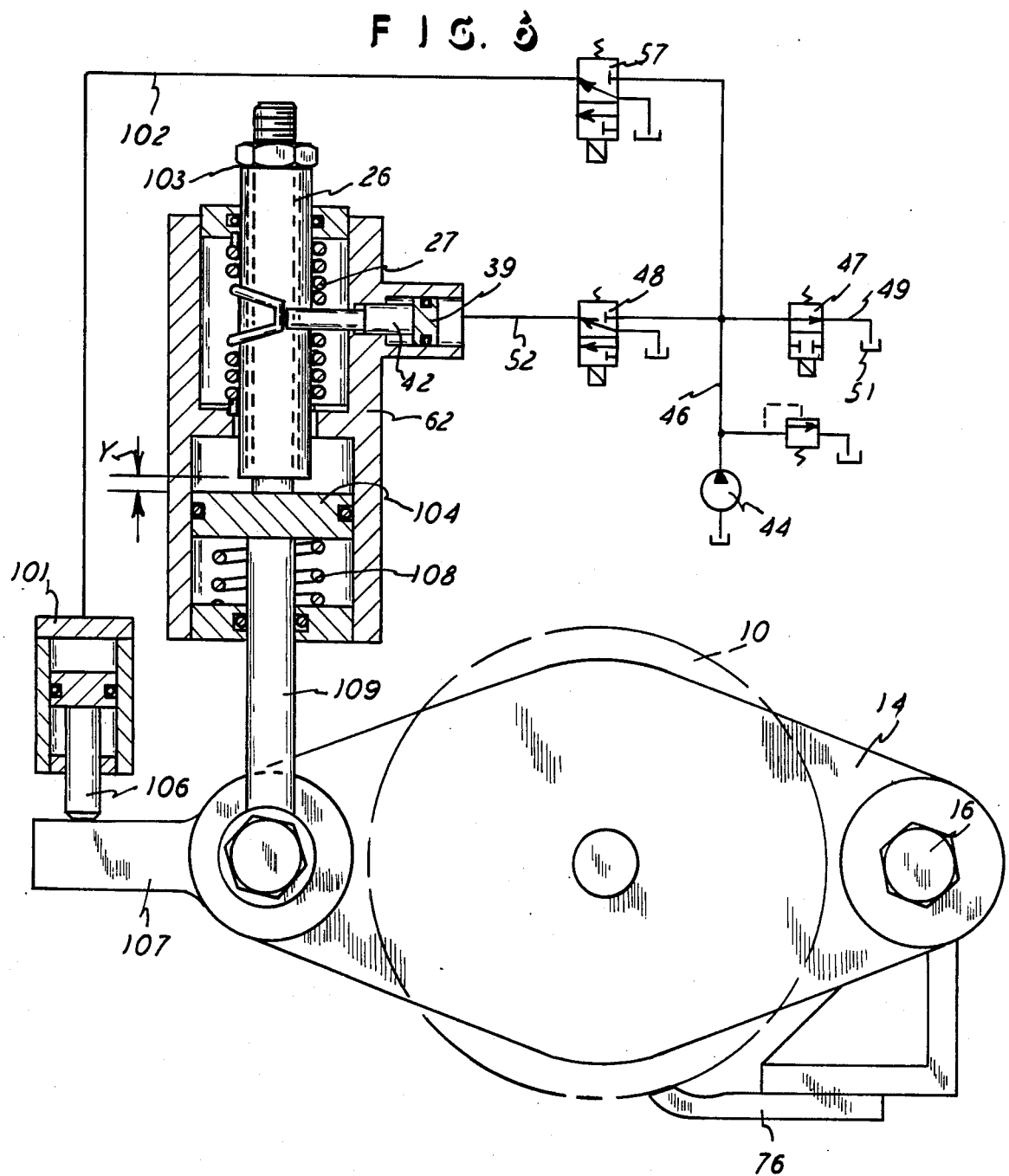

Description of the apparatus, with reference to the drawings, will also constitute a description of the method of establishing the clearence between the reel and the bedknife of the mower. Accordingly, FIG. 1 diagramatically shows a lawn mower reel 10 and a bedknife 11, and it shows a clearance designated "X" therebetween. That can be the desired clearance. Also, FIG. 1 shows a hydro mechanical arrangement for establishing the clearance "X", while FIG. 2 shows a fully mechanical arrangement for establishing its clearance designated "X" between its lawn mower reel 12 and its bedknife 13.

In FIG. 1, there can be two mower side plates 14 pivotally mounted on the mower on the pivot pin 16, and the plates can be connected with a vertically disposed link 17 which is connected to the plates 14 through a pin 18. The reel 10 has a rotatably mounted shaft 19, so that the reel 10 can rotate in the counterclockwise direction, as viewed in FIG. 1, for instance.

The link 17 extends upwardly into a hydraulic housing 19 which is fixedly mounted on the mower, and the link extends to its upper threaded, end 21, as shown. A piston 22 is attached to the link 17 to be in the fixed position therewith, as shown, and the piston 22 moves up-and-down in the cylinder 23 of the housing 19. The upper end of the housing 19 has another cylindrical opening 24 which receives a movable sleeve 26 surrounded by a wrap spring 27. The spring 27 has both ends anchored, such as with an end 28 anchored in the end cap 29 of the housing 19. Of course, the sleeve 26 is shown extending through an opening 31 in the housing 19 so that the sleeve 26 extends between the two cylindrical chambers 23 and 24. Also, the sleeve 26 is sufficiently free fitting or loose on the upper end 32 of the link 17 so that the sleeve 26 is telescoped thereon and can slide up-and-down, relative to the link 17. A jam nut 33 on the link threaded end 21, and the piston 22, confine the up-and-down sliding movement of the sleeve 26 relative to the link 17, as hereinafter described.

The wrap spring 27 coils around the sleeve 26 and can thus restrain the axial or up-and-down movement of the sleeve 26 when the spring 27 is in its normal or free position of tightly gripping on the circumference of the sleeve 26, such as shown in the position in FIG. 1. In that secured or tight position for the sleeve 26, it will therefore be seen and understood that the link 17 is limited in downward movement since the sleeve upper end 34 abuts the lower surface of the jam nut 33.

A compression spring 36 is disposed in the cylinder 23 and extends between the housing lower plug 37 and the lower surface 38 of the piston 22. It will also be seen and understood that suitable O-rings, or like fluid seals, are utilized and disposed, such as shown in the five places in FIG. 1.

A piston 39 is slidably disposed in a cylindrical opening 41 in the housing 19, and it presents a finger 42 extending into abutment with the loop 43 of the wrap spring 27. It will therefore be understood that when the finger 42 is moved leftwardly, as viewed in FIG. 1, it unwinds the wrap spring 27 and thus frees the sleeve 26 from the grip of the wrap spring 27 so that the sleeve 26 could move up or down, depending upon abutments at the opposite ends of the sleeve 26, as explained later.

To release the system, and thereby establish a maximum clearance between the reel 10 and bedknife 11, a hydraulic system is used in FIG. 1. A hydraulic pump 44 is connected through the hydraulic line 46 to two valves 47 and 48. Actuation of valve 47 closes the connection 49 which leads to the reservoir or drain 51. and that permits the pump output to go to the valve 48 which can be positioned to permit the flow to go through the line 52 and to the piston 39 to thereby engage the wrap spring 27 and release its grip on the sleeve 26. The compression spring 36 then pushes upwardly on the piston 22 which in turn pushes upwardly on the lower surface 53 of the sleeve 26 when the piston upper surface 54 moves up against the sleeve surface 53. Of course the upward movement of the link 17 causes the clearance "Y" to be transferred from below the sleeve 26 to above the sleeve 26, in FIG. 3. That will also raise the link 17 and therefore lift the reel 10 and present clearance "X". There may be a stop 56 in the cylinder 23 to limit the upward movement of the piston 22, but only after it has contacted the sleeve surface 53 and raised the sleeve 26. When the valves 47 and 48 are de-energized, then the spring 27 grips the sleeve 26 to hold the position of the sleeve 26.

The operator can then rotate the nut 33 to position it as shown in FIG. 3 and thus establish the clearance designated "Y" between the nut 33 and the sleeve surface 34. This clearance "Y" will be related to the final clearance between the reel 10 and bedknife 11 by a function of the geometry of dimensions "A" and "B" as shown related to the reel 10.

Once the clearance "Y" has been selected, it can be set by locking the jam nut 33. Valves 47 and 48 are again energized to cause the wrap spring 27 to release its grip on the sleeve 26. A third valve 57 is then energized to direct hydraulic fluid into an opening 58 in the housing 19 and thus pressurize the top of the housing cylinder 23 and therefore depress the piston 22 against the spring 36. Since the piston 22 and the link 17 are integral, the link 17 will be depressed and the reel 10 will then move downwardly to contact the cutting surface 61 on the bedknife 11. To accomplish that, the link 17 first travelled downwardly to take up the clearance "Y", and it will continue to move downwardly, along with the sleeve 26 until the reel 10 makes contact with the bedknife surface 61, as mentioned. Since there is hydraulic pressure in the upper cylinder portion 59, that pressure is exerted on the sleeve lower surface 53 to space the sleeve 26 above the piston surface 54, by a space designated "Y" in FIG. 1. It will be understood that there is now no clearance between the reel 10 and the bedknife surface 61, as mentioned.

To obtain the final desired clearance "X" the valve 48 is de-energized to release the piston 39 and to permit the spring 27 to grip the sleeve 26 in its raised position shown in FIG. 1. Next, releasing the valve 57 releases the fluid pressure in the upper cylinder 59 and that allows the compression spring 36 to push upwardly on the piston 22 and thus raise the link 17 to where the piston 22 abuts the fixed sleeve surface 53. That establishes the desired clearance "X".

Of course any debris or the like which comes between the reel 10 and the bedknife 11 can be somewhat accommodated by any slight slippage between the sleeve 26 and the wrap spring 27, to thus avoid serious damage to the mower. Also, it will be seen and understood, particularly in connection with FIG. 2, that the bedknife 13 can be the adjustable element while the reel 12 is the non-adjustable element of the two elements of the mower cutters.

FIG. 2 shows a fully mechanical arrangement, rather than utilizing any hydraulics, and here it will be seen that the same general principles prevail, in that a housing 62 contains the piston 22 and the compression spring 36 and also contains the sleeve 26 and the wrap spring 27. However, instead of the valve 57 for forcing downwardly on the piston 22, a handle 63 is mounted on a pivot pin 64 on the mower and connects with the link 17 through a pivot pin 66. Thus, through appropriate accommodation, the handle 63 can be manually moved up-and-down for the up-and-down down action of the link 17. As mentioned, the link 17 is now utilized for adjusting the bedknife 13 which is pivotally mounted on a pin 67 on the mower, and the link 17 and bedknife 13 are connected by a pin 68.

Also, instead of the valve 48 for controlling tension and release in the spring 27, a manual plunger 69 is axially movably mounted in the housing 62 to abut the spring 27 at its loop 43, as described in connection with FIG. 1. Accordingly, O-rings or like seals are shown in FIG. 2 and may be considered to be dust type of seals for protecting the interior of the housing 62.

Thus, where FIG. 2 shows a fully manual system, FIG. 1 shows a hydro-mechanical type system. Also, FIG. 1 shows a relief valve 71 which permits the escape of hydraulic pressure from the chamber 59 to avoid any excessive pressure acting downwardly on the piston 22 and thus avoid heavy loads on the cutting elements 10 and 11 during adjustments.

In these arrangements, there is therefore a lost-motion type of connection between the link 17 and the restrainer or sleeve 26, as described. The two embodiments show the two different actuating means for moving the link 17, and of course it will be understood in FIG. 2 that the link 17 has an extension 72 at the upper end thereof. Also, the sleeve 26 serves as an adjustable stop, in both embodiments, and it is available for stopping the upward movement of the respective link 17 against the sleeve lower surface 53 in establishing the final clearance "X". In this description, the wrap spring 27 is a releasable restrainer operative on the movable piece which is the sleeve 26, as being described herein.

Depressing the handle 63 while the spring 27 is released will move the bedknife into contact with the reel 12. With the sleeve 26 in a downward position contacting piston 22, clearance "Y" can be established between the sleeve and the nut. Raising the sleeve into contact with the nut, and gripping the sleeve with the spring and releasing the handle will create the clearance "X" in FIG. 2. Catches or the like could be employed for holding the handle 63 and the plunger 69 in their depressed positions while the sleeve 26 is being set.

FIGS. 4 and 6 show two other embodiments of the invention, and it will here be noticed that the reel 10 is pivotally supported on the bracket 14 mounted on the pivot bolt 16. Of course, just as in FIG. 2, the bedknife 76 of FIGS. 4 and 6 could be the pivotal member in the assembly, rather than the reel 10.

FIG. 4 is an assembly similar to FIG. 1, except for the apparatus for retaining a sleeve 77 which is comparable to the sleeve 26 in FIG. 1. In this instance, a stack of washers 78 surround the sleeve 77 at the angulation shown to thus be at a cocked angle and prevent axial movement of the sleeve 77. That is, the washers 78 engage the circumference of the sleeve 77, when the washers are in the maximum cocked position which is established by a compression spring 79 extending between the washers 78 and a nut 81 threaded into the cylindrical housing 82, as shown.

A release pin 83 extends through a housing cap 84 and has spaced apart flanges 86 which engage the washer 78 and thus move them out of the angled or cocked position and thereby release the grip of the washer 78 on the sleeve 77 when the pin 83 is depressed. A set screw 87 extends through the cap 84 and is available to abut the upper washer 78 and thereby arrange for the cocking of the washers under the influence of the compression spring 79. With this arrangement, the greater the upward force on sleeve 77 the greater will be the grip of the washers 78, as desired.

Hydraulic pressure at the inlet 88 will cause the piston 89 to move downwardly and the link 91 connected with the piston 89 will pivot the bracket 14 downwardly to where the reel 10 will contact the bedknife 76. Freedom for the sleeve 77 will also permit it to move downwardly and it can contact the piston 89 and a clearance can be developed between a lock nut 92 and a washer 93 at the upper end designated at 94 of the link 91. The clearance to be established at 94 can be the clearance designated "Y" at the lower end of the sleeve 77, and the sleeve 77 can therefore be placed into the raised position shown in FIG. 4 and the pin 83 can be released to hold the sleeve in that raised position. Pressure can then be relieved in the chamber 96, and a spring 97 below the piston 89 will urge the piston upwardly, along with the link 91, until the piston takes up the clearance "Y" and abuts the lower end of the sleeve 77. That is therefore the clearance, namely, "Y", established between the reel 10 and the bedknife 76.

FIG. 6 shows the other embodiment, and here it will be seen that the sleeve 26 is held by the wrap spring 27, as in FIG. 1, and both ends of the spring 27 are shown anchored in the housing 62 of FIG. 2.

Also, as in FIG. 1, FIG. 6 shows the pump 44 and the hydraulic line 46 extending to the valve 47 and to the valve 48. There is also the hydraulic line 49 and the shown reservoir 51 and the hydraulic line 52 which extends to the piston 39, also as in FIG. 1, all for controlling the spring 27 through the plunger 420.

However, difference from FIG. 1, is the fact that the valve 57 serviced by the pump 44 does not connect with the housing 19 of FIG. 1, but instead connects with a cylinder assembly 101 through a hydraulic line 102.

Thus, once the clearance is established at the location designated 103, that is when the sleeve 26 is lowered to the piston 104 and that again is when the reel 10 is in contact with the bedknife 76, and that is accomplished by fluid pressure in the assembly 101 to cause the rod 106 to bear downwardly on the arm 107 of the bracket 14 and thus cause the reel 10 to come into contact with the bedknife 76, as shown in FIG. 6. Then, when the sleeve 26 is placed into the shown raised position, the clearance "Y" is shown at the lower end of the sleeve 26, and, upon relieving hydraulic pressure in the assembly 101, the spring 108 will urge the piston 104 upwardly and thus transfer the clearance "Y" to the upper end of the link 109 as at 103, and that will also create that clearance "Y" between the reel 10 and the bedknife 76, all as desired.

In these embodiments, the desired clearance for the reel and bedknife is established between the lock nut and the upper end of the sleeve, and that clearance is established mechanically, as mentioned, rather than hydraulically. Then, placing the sleeve in its upper position and holding it in that position and releasing the downward force on the cutting assembly such as by hydraulics in FIGS. 1, 4 and 6, and mechanically in FIG. 2, then that clearance "Y" can be transferred to become clearance between the reel and bedknife. FIGS. 2 and 6 can be provided with a spring 111 urging the sleeve 26 upwardly through a washer 112 secured to the sleeve through the snap ring 113, to provide the clearance "Y" shown in FIG. 1.

What is claimed is:

1. Apparatus for establishing reel-to-bedknife clearance in a lawn mower, having an assembly of two elements consisting of a rotatably mounted cutting reel and a bedknife, mounting means for adjustably mounting said assembly whereby cutting clearance between said elements can be established, upon movement of either one of said elements, a link connected with one of said elements for moving said one element relative to the other of said elements, actuating means operative on said link for moving said link to move said one element into contact with said other element, an adjustable stop operative on said link for limiting movement of said link in the direction to have said one element move away from said other element, said link and said stop including a lost motion clearance therebetween for permitting the movement of said link in the direction to move said one element away from said other element, and a spring operative on said one element to yieldingly urge said one element away from said other element to thereby establish the clearance upon release of said actuating means.

2. The apparatus for establishing reel-to-bedknife clearance in a lawn mower as claimed in claim 1, wherein said actuating means is a hydraulic assembly having a piston and rod and with the rod being said link.

3. The apparatus for establishing reel-to-bedknife clearance in a lawn mower as claimed in claim 2, wherein said adjustable stop includes a movable piece disposed in abutting relationship with said link, and a releasable restrainer operative on said movable piece for restraining said movable piece before said actuating means is released.

4. The apparatus for establishing reel-to-bedknife clearance in a lawn mower as claimed in claim 3, wherein said movable piece is a sleeve slidably telescoped over said link, and said sleeve and said link having a threaded relationship therebetween for limiting sliding relationship therebetween.

5. The apparatus for establishing reel-to-bedknife clearance in a lawn mower as claimed in claim 4, wherein said restrainer is a wrap spring extending around said sleeve for releasably restraining said sleeve, and means for releasing said wrap spring.

6. The apparatus for establishing reel-to-bedknife clearance in a lawn mower as claimed in claim 5, wherein said actuating means and said means for releasing said wrap spring are hydraulically powered.

7. The apparatus for establishing reel-to-bedknife clearance in a lawn mower as claimed in claim 5, wherein said actuating means and said means for releasing said wrap spring are manually operated means.

8. The apparatus for establishing reel-to-bedknife clearance in a lawn mower as claimed in claim 4, wherein said releasable restrainer is a stack of gripping washers telescoped on said sleeve, end control means for releasably positioning said washers into gripping relationship with said sleeve for restraining said sleeve against axial movement, and means for releasing said control means.

9. The apparatus for establishing reel-to-bedknife clearance in a lawn mower as claimed in claim 1, wherein said actuating means is a manually movable device connected with said link for the movment of said link.

10. The apparatus for establishing reel-to-bedknife clearance in a lawn mower as claimed in claim 1, wherein said actuating means is separated from said link, and said actuating means and said spring both being operative on said one element to respectively move said one element in one of two directions opposite from each other.

11. The apparatus for establishing reel-to-bedknife clearance in a lawn mower as claimed in claim 10, wherein said actuating means is hydraulically powered.

12. A method for establishing reel-to-bedknife clearance in a lawn mower having an assembly of two elements consisting of a rotatably mounted cutting reel and a bedknife, the steps comprising moving the elements into contact with each other, utilizing a lost-motion assembly of two parts connected with one of the two elements movable toward and away from the other of the two elements, establishing the total amount of lost-motion between the two parts, and holding one of the two parts while allowing the other of the two parts to move to thereby allow the one element to moveaway from the other elements in the lost-motion amount.

* * * * *

UNITED STATES PATENT AND TRADEMARK OFFICE
CERTIFICATE OF CORRECTION

PATENT NO. : 4,663,924

DATED : 12 May 1987

INVENTOR(S) : Anthony J. Saiia

It is certified that error appears in the above–identified patent and that said Letters Patent are hereby corrected as shown below:

Claim 12, last line, "elements" should read -- element --.

Signed and Sealed this

Nineteenth Day of January, 1988

*Attest:*

DONALD J. QUIGG

*Attesting Officer*  *Commissioner of Patents and Trademarks*